US007415068B2

United States Patent
François et al.

(10) Patent No.: US 7,415,068 B2
(45) Date of Patent: Aug. 19, 2008

(54) PROCESS FOR THE FORMAT CONVERSION OF AN IMAGE SEQUENCE

(75) Inventors: Edouard François, Bourg des Comptes (FR); Gwenael Kervella, Rennes (FR); Dominique Thoreau, Cesson Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 1073 days.

(21) Appl. No.: 09/924,322

(22) Filed: Aug. 8, 2001

(65) Prior Publication Data

US 2002/0021757 A1  Feb. 21, 2002

(30) Foreign Application Priority Data

Aug. 11, 2000  (FR) ................... 00 10551

(51) Int. Cl.
*H04N 7/12* (2006.01)
(52) U.S. Cl. ............. 375/240.16; 375/240; 375/240.01; 375/240.12
(58) Field of Classification Search ............ 375/240.16, 375/240, 240.01, 240.12, 240.03, 240.26, 375/240.27, 240.24; 348/699; 382/734; 386/68
See application file for complete search history.

(56) References Cited

U.S. PATENT DOCUMENTS 5,442,400 A    8/1995  Sun et al. ................... 348/402
5,455,629 A *  10/1995 Sun et al. ................ 375/240.27
5,602,956 A *   2/1997 Suzuki et al. ................ 386/68
5,701,164 A *  12/1997 Kato ........................... 348/699
5,761,342 A *   6/1998 Yoshida ...................... 382/234
5,870,146 A *   2/1999 Zhu ....................... 375/240.03
6,259,741 B1*   7/2001 Chen et al. ............. 375/240.26
6,333,952 B1*  12/2001 Lim et al. .............. 375/240.27

FOREIGN PATENT DOCUMENTS

| EP | 0651574 A1 | 5/1995 |
| EP | 0805592 A2 | 11/1997 |
| GB | 2305833 A | 4/1997 |
| WO | WO 98/28917 | 7/1998 |
| WO | WO 98/32285 | 7/1998 |
| WO | WO 99/34603 | 7/1999 |
| WO | WO 00/11875 | 3/2000 |

OTHER PUBLICATIONS

N. Björk et al, "Transcoder Architectures For Video Coding", IEEE Transactions on Consumer Electronics, vol. 44, No. 1, Feb. 1998, pp. 88-98. (XP-000779254).
French Search Report dated: Feb. 13, 2001.

\* cited by examiner

*Primary Examiner*—Allen Wong
(74) *Attorney, Agent, or Firm*—Joseph J. Laks; Paul P. Kiel; Guy H. Eriksen

(57) ABSTRACT

A process for converting the format of an image sequence wherein, for a coded pixel group to be converted, if the mode of coding used is of the inter type with no residue, the conversion is performed by a copy of a converted pixel group of a preceding image linked by the motion vector associated with said coded pixel group.

7 Claims, 3 Drawing Sheets

PROCESS FOR THE FORMAT CONVERSION OF AN IMAGE SEQUENCE

FIELD OF THE INVENTION

The invention relates to a process and a device for the format conversion of an image sequence employing coded video data.

BACKGROUND OF THE INVENTION

Most applications which require video display work with encoded video data. After decoding, these data are often available in a format which is not compatible with the desired display format or composition format. It is thus necessary, in most cases, to perform a format conversion employing compressed video data, before displaying the corresponding image or performing the image composition. This format conversion is applied to the complete image and generally eats up time and memory space, since it involves successive additions and multiplications for each pixel of the image.

For example, the output format from decoding a binary video data stream to the H 263 standard is of the type 4:2:0, Y U V. The Java software graphics interface libraries (AWT) provide API (standing for Application Program Interface) interfaces for image formats based on the 4:4:4, R G B format. Thus, the use of an "applet" (Java application loaded via the Internet) for such a stream requires that the images in the 4:2:0, Y U V format be converted into images in the 4:4:4, R G B format.

The term image used subsequently shall apply to any type of image, frame, biframe, etc. and regardless of the type of scanning.

The expression decoding domain will refer to anything concerning the reception by the decoder of the coded data and their decoding and the expression display domain will refer to anything concerning the utilizing of the decoded data for their composition and their display. The conversion process consists in switching from the decoding domain to the display domain. The decoding processes customarily utilize a predictive temporal mode in which images are predicted from preceding or succeeding images. This involves for example the MPEG 1, MPEG 2, MPEG 4, H261 or H263 standards. In these standards, an image of P type (predictive) is predicted from a preceding image of I type (intra) or from a preceding image of P type and an image of B type (bi-directional) is predicted from a preceding image of I or P type and from a succeeding image of I or P type.

In one example, in respect of the coding of an image block in an image, the preceding image is reconstructed and a motion estimation is performed to determine, in this reconstructed image, the block best correlating with the image block to be coded. The reconstructed image is then motion compensated employing the motion vector corresponding to this estimation so as to provide the predicted block. The predicted block is subtracted from the current block to provide a block called residue, which is coded and transmitted.

The decoding process consists in calculating the predicted blocks by reconstructing the preceding images and in adding thereto the blocks of residue transmitted from the current image.

In the case of images of B or P type, the blocks are predicted from the preceding reference image and, for the B type, also from the succeeding reference image. These reference images are reconstructed at the decoder level and the predicted block is calculated from these images and the motion vectors transmitted in the data stream. The residue block transmitted in the data stream is decoded then added to the predicted block defined by the associated motion vector so as to provide the reconstituted image block in the image.

FIG. 1 very schematically represents the data decoding and conversion process.

The video data pertaining to the reference images are received on a time prediction circuit 1 so as to provide an adder 3 with the predicted images. The video data pertaining to the current image are received on a decoding circuit 2 so as to provide the adder 3 with decoded images. The data output by the adder 3, which correspond to the reconstituted image, are transmitted to a format conversion circuit 4 which converts the images so as to transmit them to a display or to an image composition circuit.

The structure to which the various data compression operations are applied, in the MPEG standard, is the macroblock. The pixels are grouped into image blocks, for example 16×16 pixels in size, four luminance blocks and the corresponding chrominance blocks constituting the macroblock. If the image format, during coding, is 4:2:0, Y, Cr, Cb, the macroblock consists of four luminance blocks and two chrominance blocks. In the predictive temporal mode, each macroblock has its own decision mode. As stated otherwise, the coding mode is decided for each macroblock. It may involve a coding of intra type for which no prediction is used, of predictive type utilizing a backward, forward (as it is known in the standard) or bi-directional motion vector. A macroblock of an image of P type can be coded in intra mode while the succeeding macroblock can be coded in inter mode using motion compensation employing a reference image.

Other modes of compression, which are not necessarily standardised, are based on calculations pertaining to pixel groups which are not image blocks as they are described in the MPEG standard. The prediction modes may be based on regions obtained by segmenting the image according to homogeneity criteria.

The invention applies to these pixel groups, also referred to as gop hereinbelow. This may therefore involve macroblocks or image blocks or else small complex structures such as connected regions. The coding decision mode is independent for each gop, which may be coded independently or by employing preceding and/or succeeding images.

An aim of the proposed invention is to alleviate the drawbacks described previously.

SUMMARY OF THE INVENTION

Its subject is a process for the format conversion of an image sequence employing video data coded on the basis of a structure of pixel groups, wherein, for a coded pixel group to be converted, if the mode of coding used is of the inter type with no residue, the conversion is performed by a copy of a converted pixel group of a preceding image linked by the motion vector associated with said coded pixel group.

If the motion vector associated with the pixel group is null, the conversion is performed by recopy of the co-located pixel group and, if the motion vector is different from zero, the conversion is performed by motion compensation in a preceding converted image.

Its subject is also a process for the format conversion of an image sequence employing video data coded on the basis of a structure of pixel groups, wherein, if for a coded pixel group to be converted an error of transmission of the coded data brings about an error masking mode equivalent to a decoding of the inter type with no residue, the conversion is performed by a copy of a converted pixel group of a preceding image linked by the motion vector associated with the said coded pixel group.

Its subject is also a process for the format conversion of an image sequence employing video data coded on the basis of a structure of pixel groups, the coded data comprising complementary data allowing scalability, that is to say the obtaining of images of different resolutions, wherein, in the case where the complementary data pertaining to a pixel group and to a given resolution have zero value, this pixel group for the converted image of given resolution is obtained from a group of converted pixels of the image of lower resolution.

The format conversion is thus not applied to the whole image but simply to the pixel groups whose residue is not zero.

When the decoding mode is a temporal prediction mode corresponding to a motion compensation and to the addition of a residue, in the case where this residue is zero, the motion compensation is applied in the display domain and not in the decoding domain. If there is no motion compensation, a recopy of a group of converted pixels is performed.

The main advantage of the invention is to optimise the calculation time for the format conversion by utilizing the decision modes used for each gop in the cases of temporal prediction. Motion compensation of a gop in the display domain generally eats up less time than the format conversion of this gop. Even more so when the motion is zero where it then involves a simple recopy. The decoder is simplified and its cost is thereby thus reduced.

BRIEF DESCRIPTION OF THE DRAWINGS

Other features and advantages of the invention will become clearly apparent in the following description given by way of non-limiting example in conjunction with the appended figures which represent.

DETAILED DESCRIPTION OF PREFERRED EMBODIMENTS

Figure 2:
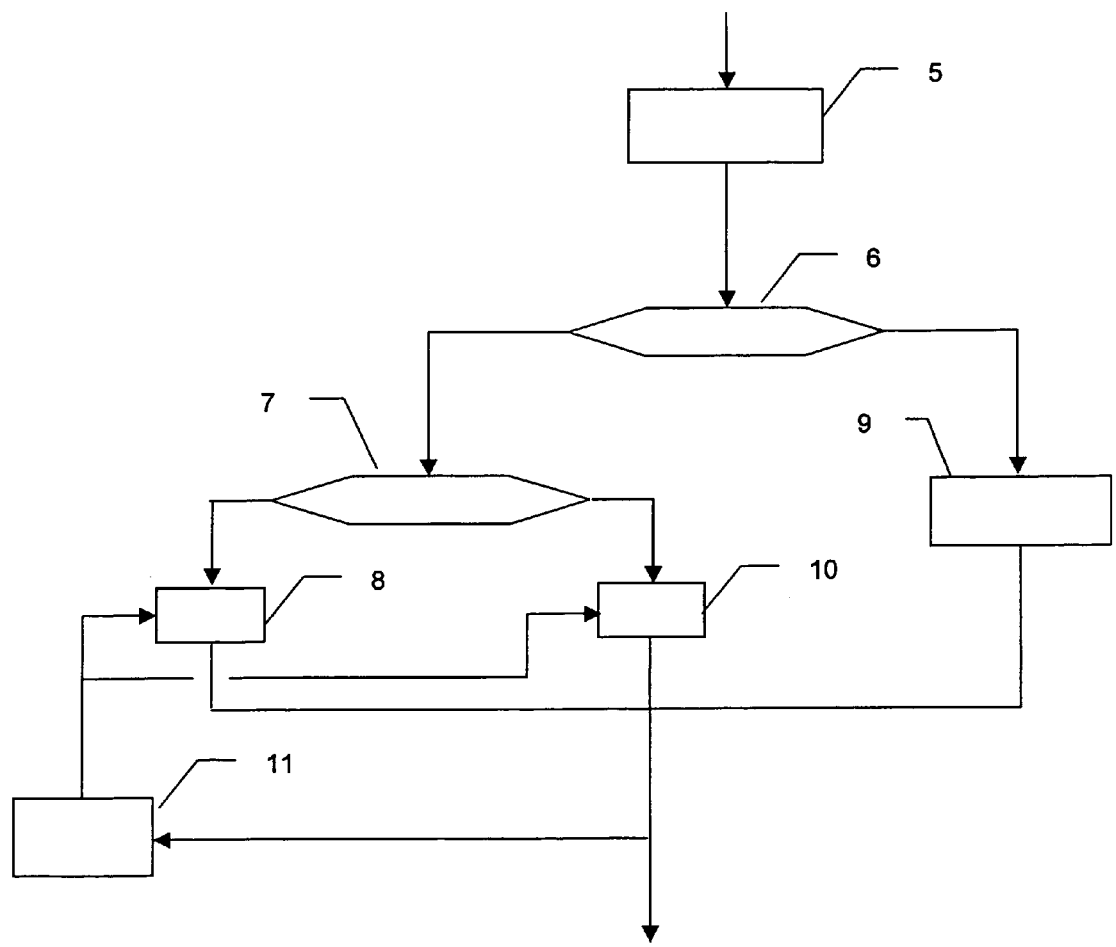
FIG. 2, a flow chart of the conversion process.

The image format conversion process according to the invention is described in FIG. 2.

A first step 5 receives the coded video data, for example in the form of a data stream. It performs a decoding of these data. It stores the information pertaining to the mode of coding, inter or intra, to the residue and to the motion vectors for each gop. For example, a flag indicates whether the residue is coded, that is to say non-null, or if it is not coded, that is to say if it is null.

The formation conversion is carried out via the following steps:

Step 6 performs, for each successive pixel group, a test on the coding mode used.

If the coding mode is of the inter type and if the residue of the gop is null, (inter type with no residue), then the succeeding step is step 7.

If the coding mode is not of the inter type (intra coding) or, in the case where the coding mode is of the inter type, if the residue is not null, the succeeding step is step 9 which carries out a conventional format conversion for the pixel group under consideration. Step 7 performs a new test on the coding mode used for the pixel group. If the motion vector of the gop is a null vector, the succeeding step is step 8. If the motion vector is not a null vector, the succeeding step is step 10 which carries out motion compensation employing this vector and the preceding displayed image, that is to say converted image, which is also transmitted to this step.

Step 8 performs a recopy of the pixel group of the preceding image displayed which is transmitted to this step. The gop in the display domain is thus obtained by simple recopying of the corresponding gop (co-located) of the preceding image displayed.

The outputs from step 9, 10 and 8 correspond to the pixel groups of the current image to be displayed and these data are transmitted to step 11 which performs storage of these pixel groups of this current image. This step provides, upon processing the current image, the preceding image stored which is transmitted to step 8 and 10 as indicated previously. This preceding image is the reference image from which the motion estimation for the current image has been performed.

The complete current image is thus available at the output of steps 9, 10 and 8 for display on the screen after all the pixel groups constituting this image have been processed.

The information stored in step 5 is obtained differently according to the coding standard used. In the case of the MPEG 2 standard, a null residue macroblock is encountered in the "skipped macroblock" mode (as it is known in the standard) and in the "uncoded" modes.

The "skipped macroblock" mode consists of a macroblock for which no data item is coded. All the DCT coefficients are regarded as being equal to zero. The decoder forms a prediction concerning the skipped macroblocks by utilizing their temporal or spatial environment. The processing of skipped macroblocks is different depending on whether it involves images of P type or images of B type.

In the case of images of P type, the motion vector predictors are reset to zero. The motion vector transmitted has the value zero.

Consequently, the current macroblock is the same as that of the preceding image at the same location (co-located).

In the case of images of B type, the direction of prediction (forward/backward/bi-directional) is the same as for the preceding macroblock. The motion vector predictors are not modified.

The "uncoded" mode consists, for its part, of a macroblock which contains a header and no data item concerning the DCT coefficients. The forward and/or backward motion vectors are obtained, on the decoder side, by virtue of the macroblock header. Depending on the type of image, various configurations exist:

for the images of P type, the uncoded motion compensated (MC) mode is used. If however the backward motion vector is null, we revert to the skipped macroblock mode.

for the images of B type, the various coding modes are "uncoded backward", "uncoded forward", "uncoded interpolated" (bi-directional).

Figure 3:
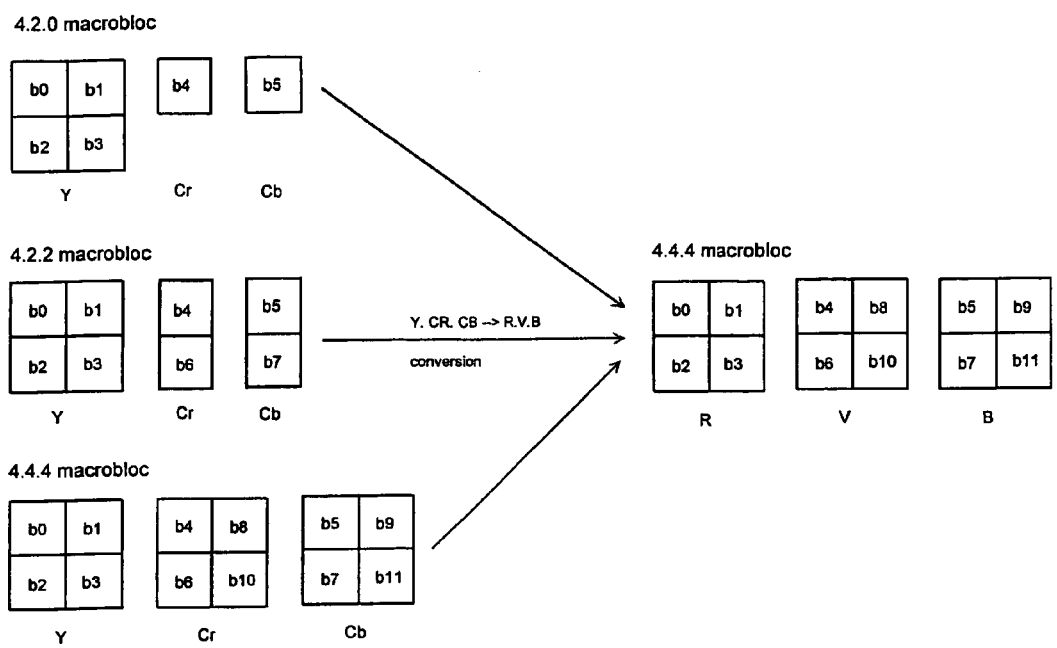
FIG. 3, various chrominance formats for the conversion of a macroblock.

FIG. 3 represents the conversion into a 4:4:4 R G B standard from various types of standards corresponding to chrominance formats related to the macroblock structures.

In the inter mode, outside of the "skipped macroblocks" mode where all the blocks making up the macroblock are not coded, the blocks making up the macroblock may or may not be coded. It is the "pattern_code structure" cue or cbp (standing for coded block pattern) code which indicates those blocks for which a residue is not coded, that is to say has the value zero. According to a characteristic of the invention, the conversion of the Y luminance and Cr, Cb chrominance blocks into R, G, B blocks is undertaken as a function of the value of the cbp code. An example is given below:

Format 4:2:0

If the cbp code indicates that blocks b3, b4 and b5 of the Y, Cr, Cb domain are not coded, then one or more of blocks b3, b10 and b11 of the R, G, B domain may be a recopy of the blocks of the preceding image and do not require any conversion.

Format 4:2:2

If the cbp code indicates that blocks b3, b6 and b7 of the Y, Cr, Cb domain are not coded, then blocks b3, b10 and b11 of R, G, B domain may be a recopy of the blocks of the preceding image and do not require any conversion.

Format 4:4:4

If the cbp code indicates that blocks b3, b10 and b11 of the Y, Cr, Cb domain are not coded, then blocks b3, b10 and b11 of the R, G, B domain may be a recopy of the blocks of the preceding image and do not require any conversion.

In the case where the gop is an image block, the cbp code cues therefore make it possible to determine the image blocks with zero residue, and for which a conventional conversion processing of the block is not required; the image block in the display domain is obtained by simple recopying of another block in this display domain.

A particular case concerns errors in the transmission of the coded data preventing the decoding of gops.

The decoders, when a transmission error is recognised, implement error masking algorithms. These algorithms for reconstructing gops consist in copying or motion-compensating the decoded data pertaining to one or more preceding images. The missing gops are reconstructed from gops and from motion vectors coded previously.

One example is a simple recopying of the co-located macroblock of the preceding image. The invention proposes, instead of applying the format conversion to the macroblock which will be used to replace the missing macroblock, that the converted co-located macroblock of the preceding image quite simply be recopied.

The format conversion, as regards the missing gops, is not therefore required. The process according to the invention is implemented when the decoder detects an error. It applies the same error masking operation as in the decoding domain. However, the reconstruction of the gops is performed in the display domain, that is to say starting from converted blocks instead of decoded blocks.

Certain algorithms implemented by the decoders perform simple operations on the decoded data, for example so as to improve the image quality or to add a logo. Thus, a processing algorithm can decide, for a decoded image declared too dark, to add a continuous component (offset) to the DCT coefficients in order to artificially increase the luminance.

Instead of performing this addition of an offset value on the decoded data so as to obtain the new macroblock, if we take the example of a macroblock, and subsequently to convert it in the display domain, the invention proposes, in respect of the uncoded macroblocks, that is to say those having a null residue, that this operation be applied directly to the converted macroblocks. It is the converted macroblock corresponding to the macroblock with null residue which is utilized rather than the decoded macroblock. The converted offset is added to it, this offset being different in the decoding domain and in the display domain, to obtain the new converted macroblock.

The super-position of a logo consists in adding a signal into several decoded macroblocks, an operation which is identical for all the images. The solution proposed consists in adding this signal or more exactly the converted signal to converted macroblocks, that is to say in the display domain.

Another application relates to scalability.

Certain codings such as the MPEG2 or MPEG4 standard provide for scalability at the level of the resolution of the image. A base layer is firstly coded. This base layer can be improved by adding residues originating from successive layers of improvement, which have the same size as the gops of the base layer. The same principle of format conversion as that proposed in the case of temporal prediction can then be applied here.

Figure 1:
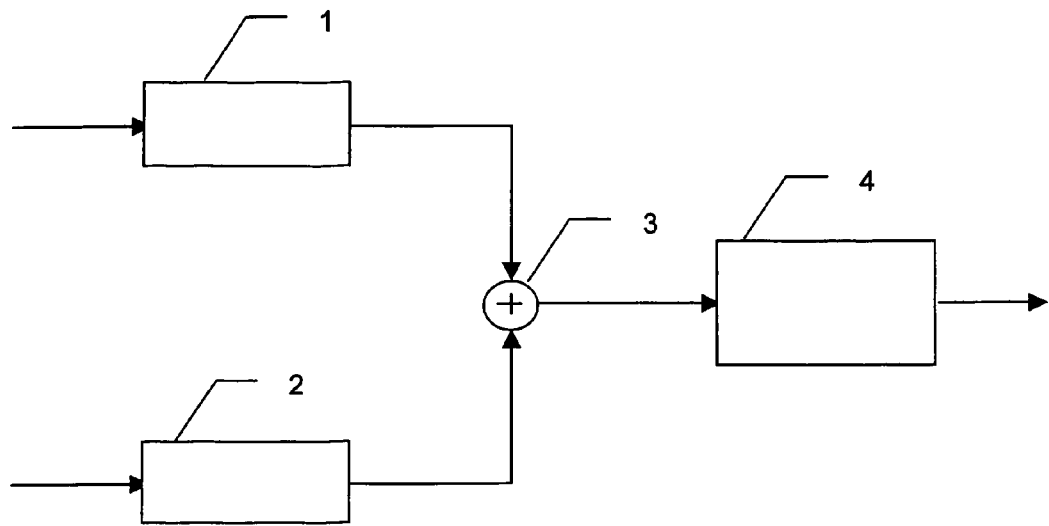
FIG. 1, a schematic representation of the data decoding and conversion process,.
Figure 4:
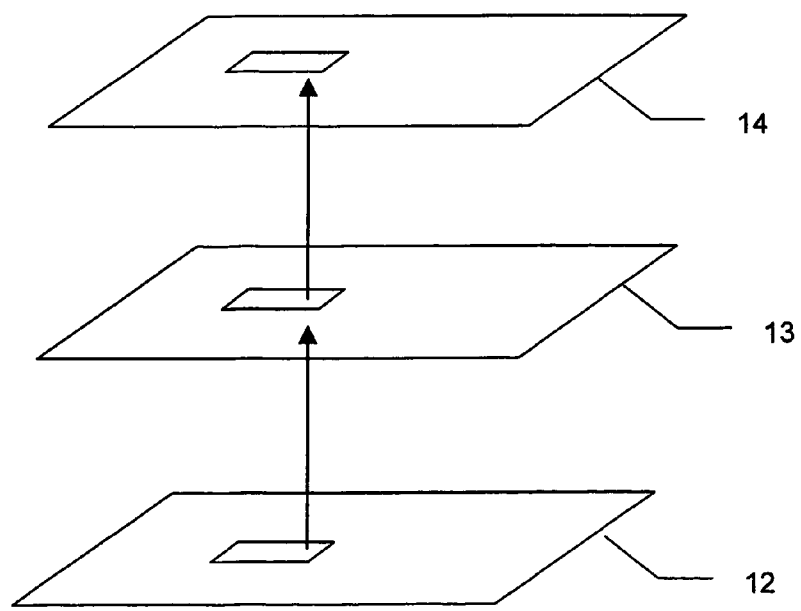
FIG. 4, an illustration of the scalability in a macroblock structure.

FIG. 4 represents a base layer 12, a level 1 layer 13 and a level 2 layer 14.

The decoder firstly decodes the base layer then possibly the layers of higher resolution. These various layers correspond to residues which are added to the base layer to improve the accuracy in the decoded image. In the example of a macroblock structure, if for a given layer the residue of a macroblock is zero, the process consists in copying the converted macroblock of the preceding layer. It is thus not necessary to perform a format conversion to obtain the macroblock pertaining to this given layer.

This scalability, for the gops of the layer of higher resolution, may be regarded as a inter coding mode with no residue, with null motion vector. The inter coding is undertaken between the layer of higher resolution level and the base layer.

The conversion formats described here are not limiting and the invention applies to any type of format conversion.

It also applies to the "inter in intra" coding modes which consist in coding a gop of an image as a function of a preceding gop of the same image rather than as a function of a gop of a preceding image. If the residue is zero, the "inter in intra" coded gop is converted by simple recopying of the gop already converted in the same image.

The invention is all the more effective when the coding gives rise to a large number of null residue blocks, this being the case for applications which do not require high quality reconstruction, in particular video applications on the Internet where the bit rate is low. It is also effective for images with little motion for example for videophone applications.

What is claimed:

1. Process for the format conversion of an image sequence employing video data coded on the basis of a structure of pixel groups comprising a first step for decoding the coded data and a second step of converting of the decoded data, wherein, for a coded pixel group to be converted, if the decoding mode is of the "inter" type with no residue, the conversion is performed by a copy of a converted pixel group of a preceding image linked by the motion vector associated with said coded pixel group.

2. Process according to claim 1, wherein, if the motion vector associated with the pixel group is null, the conversion is performed by recopy of the co-located pixel group and, if the motion vector is different from zero, the conversion is performed by motion compensation in a preceding convened image.

3. Process according to claim 1, wherein the data are coded according to the MPEG standard, the pixel group is an image block and the coding mode is determined from the cbp (coded block pattern) code defining the apportionment of the coded blocks in a macroblock.

4. Process according to claim 1, wherein the data are coded according to the MPEG standard, the pixel group is a macroblock and said coding mode is determined from the "skipped macroblock" or "uncoded" mode.

5. Process according to claim 1, the format conversion being supplemented with a modification of the display employing a simple mathematical operation applicable at the decoded pixel group level, wherein the operation, adapted to the display domain, is applied to the copied convened pixel group.

6. Process according to claim 5, wherein the simple operation is the addition of an offset.

7. Process for the format conversion of an image sequence employing video data coded on the basis of a structure of pixel groups comprising a first step for decoding the coded data and a second step of converting of the decoded data, wherein, if for the decoding of a pixel group to be converted an error of transmission of the coded data brings about an error masking mode equivalent to a decoding of the inter type with no residue, the conversion is performed by a copy of a converted pixel group of a preceding image linked by the motion vector associated with said coded pixel group.

* * * * *

UNITED STATES PATENT AND TRADEMARK OFFICE
CERTIFICATE OF CORRECTION

PATENT NO. : 7,415,068 B2
APPLICATION NO. : 09/924322
DATED : August 19, 2008
INVENTOR(S) : Edouard Francois, Gwenael Kervella and Dominique Thoreau It is certified that error appears in the above-identified patent and that said Letters Patent is hereby corrected as shown below:

In Claims 2 and 5 <u>convened</u> should be changed to <u>converted</u> as follows:

Col. 6 Claim 2 line 60 reads "performed by motion compensation in a preceding convened image."

Col. 6 Claim 2 line 60 should read "...performed by motion compensation in a preceding converted image."

Col. 7 Claim 5 line 9 reads "...the display domain, is applied to the copied convened pixel group."

Col. 7 Claim 5 line 9 should read "...the display domain, is applied to the copied converted pixel group."

Signed and Sealed this

Twenty-fourth Day of February, 2009

JOHN DOLL
*Acting Director of the United States Patent and Trademark Office*